United States Patent
Bertolami et al.

(10) Patent No.: US 8,797,321 B1
(45) Date of Patent: Aug. 5, 2014

(54) AUGMENTED LIGHTING ENVIRONMENTS

(75) Inventors: Joseph Bertolami, Seattle, WA (US); Matthew L. Bronder, Bellevue, WA (US); Michael A. Dougherty, Issaquah, WA (US); Robert M. Craig, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 970 days.

(21) Appl. No.: 12/416,397

(22) Filed: Apr. 1, 2009

(51) Int. Cl.
*G06T 15/50* (2011.01)

(52) U.S. Cl.
USPC .......................................... 345/426; 345/633

(58) Field of Classification Search
USPC ................................................. 345/426, 633
See application file for complete search history.

(56) References Cited

U.S. PATENT DOCUMENTS

| | | | |
|---|---|---|---|
| 7,479,967 | B2 | 1/2009 | Bachelder |
| 2002/0095276 | A1 | 7/2002 | Rong |
| 2007/0038944 | A1 | 2/2007 | Carignano |
| 2007/0236485 | A1* | 10/2007 | Trepte ............................ 345/207 |
| 2008/0192048 | A1 | 8/2008 | Nobre |
| 2008/0211813 | A1 | 9/2008 | Jamwal |
| 2009/0027391 | A1 | 1/2009 | Burley |

FOREIGN PATENT DOCUMENTS

WO    WO 2008/145980    12/2008

OTHER PUBLICATIONS

Mori et al. "Estimation of Object Color, Light Source Color, and Direction by Using a Cuboid", Systems and Computers in Japan, vol. 36, No. 12, 2005, Translated from Denshi Joho Tsushin Gakkai Ronbunshi, vol. J87-D-II, No. 10, Oct. 2004, pp. 1973-1982.*

Jeon et al. "Viewpoint Usability for Desktop Augmented Reality", The International Journal of Virtual Reality, 2006, 5(3):33-39.*

Feng, Y., "Estimation of Light Source Environment for Illumination Consistency of Augmented Reality," 2008 Congress on Image and Signal Processing, IEEE, http://ieeexplore.ieee.prg/stamp/stamp.jsp?arnumber=04566587, 2008, pp. 771-775.

Supan et al., "Real-Time Image Based Lighting in an Augmented Environment," http://staff.fh-hagenberg.at/haller/research-realtimeIBL.html, last updated 2005, pp. 1-2.

Kanbara et al., "Real-Time Estimation of Light Source Environment for Photorealistic Augmented Reality," Graduate School of Information Science, http://yokoya.naist.jp/paper/datas/749/icpr04.pdf, downloaded 2009, pp. 1-4.

Agusanto et al., "Photorealistic Rendering for Augmented Reality using Environment Illumination," Proceedings of the Second IEEE and ACM International Symposium on Mixed and Augmented Reality (ISMAR'03), IEEE, http://ieeexplore.ieee.org/stamp/stamp.jsp?tp=&arnumber=1240704&isnumber=27815, 2003, pp. 1-9.

* cited by examiner

*Primary Examiner* — Maurice L McDowell, Jr.
(74) *Attorney, Agent, or Firm* — Micah Goldsmith; Judy Yee; Micky Minhas

(57) ABSTRACT

A method and apparatus for rendering the lighting of virtual objects in an augmented reality display. The method includes determining local and ambient light sources based on data provided by one or more light sensors. The light in the physical lighting environment is accounted for by attributing the light to local light sources and/or ambient light sources. A synthesized physical lighting environment is constructed based on the light characteristics of the local and/or ambient light sources, and is used in properly rendering virtual objects in the augmented reality display.

28 Claims, 5 Drawing Sheets

AUGMENTED LIGHTING ENVIRONMENTS

COPYRIGHT NOTICE AND PERMISSION

A portion of the disclosure of this document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2009 Microsoft Corp.

FIELD OF TECHNOLOGY

The presently disclosed subject matter relates to the field of augmented reality. More particularly, the subject matter relates to the lighting environment of the augmented reality and rendering virtual objects in an augmented reality display with the lighting of the physical environment.

BACKGROUND

In order for a virtual object to appear natural and convincing within the real world, the virtual object must be properly rendered. Typically, augmented reality approaches focus on placing and orienting a virtual object within a physical world. However, these approaches typically ignore issues of rendering the virtual object in the physical world, including color calibration, artificial motion blur, increased anti-aliasing, and physical lighting environment reconstruction. Without addressing these rendering issues, the virtual object will appear unnatural or out-of-place when inserted into a display of the physical world.

Accordingly, a need exists for approaches to properly render virtual objects shown in a physical world of an augmented reality display. More specifically, a need exists to address the rendering issue of physical lighting environment reconstruction.

SUMMARY

One aspect of correctly rendering virtual objects in a physical world of an augmented reality display is properly rendering the lighting of the virtual object and adjusting the physical world's appearance because of the inclusion of the virtual object.

When analyzing the physical lighting environment, the light sources which provide light to the physical world can be determined or estimated. Determining or estimating a light source includes measuring or estimating one or more of the following light characteristics: the location of the light source, the direction of the light, the color of the light, the shape of the light, the intensity of the light, and the coherence or diffusion properties of the light. A physical lighting environment model of the physical world can be constructed using these characteristics of each light source.

The characteristics of local light sources in the physical environment can be determined with one or more light sensors. Light that is not accounted for by local light sources can be attributed to estimated ambient light sources. A synthesized physical lighting environment can be created for application to a virtual object placed in the physical environment within an augmented reality display.

The determination and estimation of local and ambient light sources can be iterated over time to more accurately determine the characteristics of local light, to better estimate ambient light sources, to account for local light sources that leave the view of a light sensor, and to more accurately render a virtual object in a physical environment of an augmented reality display.

A light sensor may also be able to determine secondary environmental characteristics, such as detection of indoor lighting or outdoor lighting, whether the light is rapidly changing or relatively constant, and similar situations. These secondary considerations may be useful for improving the rendering of the virtual object.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects shown. The following figures are included.

DETAILED DESCRIPTION

Exemplary Game Console, PC, and Networking Aspects

Figure 1:
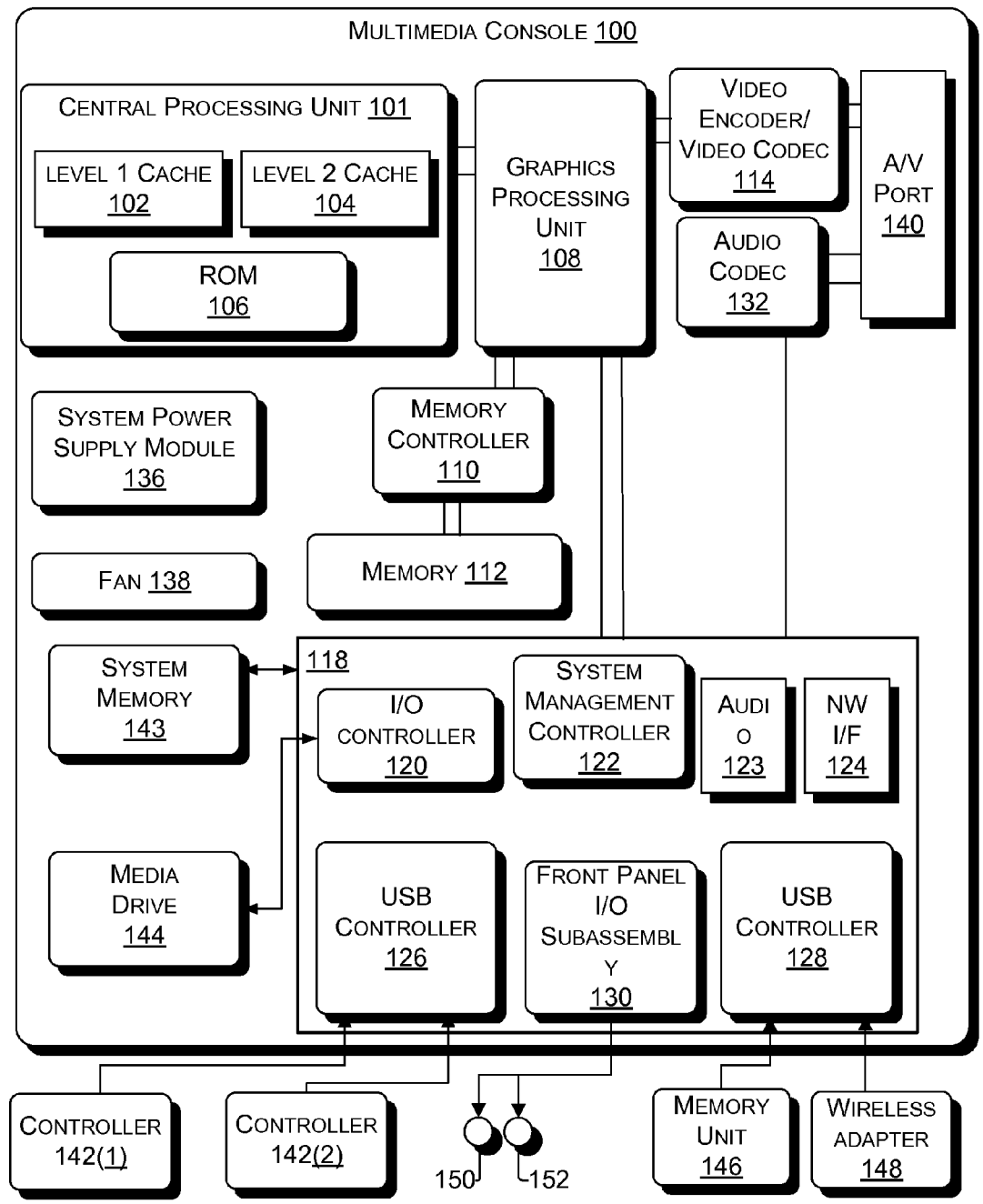
FIG. 1 illustrates an exemplary console for subject matter discussed herein.

This section of the present disclosure provides the general aspects of an exemplary and non-limiting game console. Referring now to FIG. 1, a block diagram shows an exemplary multimedia console. The multimedia console 100 has a central processing unit (CPU) 101 having a level 1 (L1) cache 102, a level 2 (L2) cache 104, and a flash ROM (Read-only Memory) 106. The level 1 cache 102 and level 2 cache 104 temporarily store data and hence reduce the number of memory access cycles, thereby improving processing speed and throughput. The flash ROM 106 may store executable code that is loaded during an initial phase of a boot process when the multimedia console 100 is powered. Alternatively, the executable code that is loaded during the initial boot phase may be stored in a flash memory device (not shown). Furthermore, ROM 106 may be located separate from CPU 101.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 and CPU 101 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory unit 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless interface components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity, 3D, surround, and stereo audio processing according to aspects of the present disclosure described above. Audio data is carried between the audio processing unit 123 and the audio codec 126 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on or rebooted, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 may allow one or more users to interact with the system, watch movies, listen to music, and the like. However, with the integration of broadband connectivity made available through the network interface 124 or the wireless adapter 148, the multimedia console 100 may further be operated as a participant in a larger network community. In this latter scenario, the console 100 may be connected via a network to a server, for example.

Figure 2:
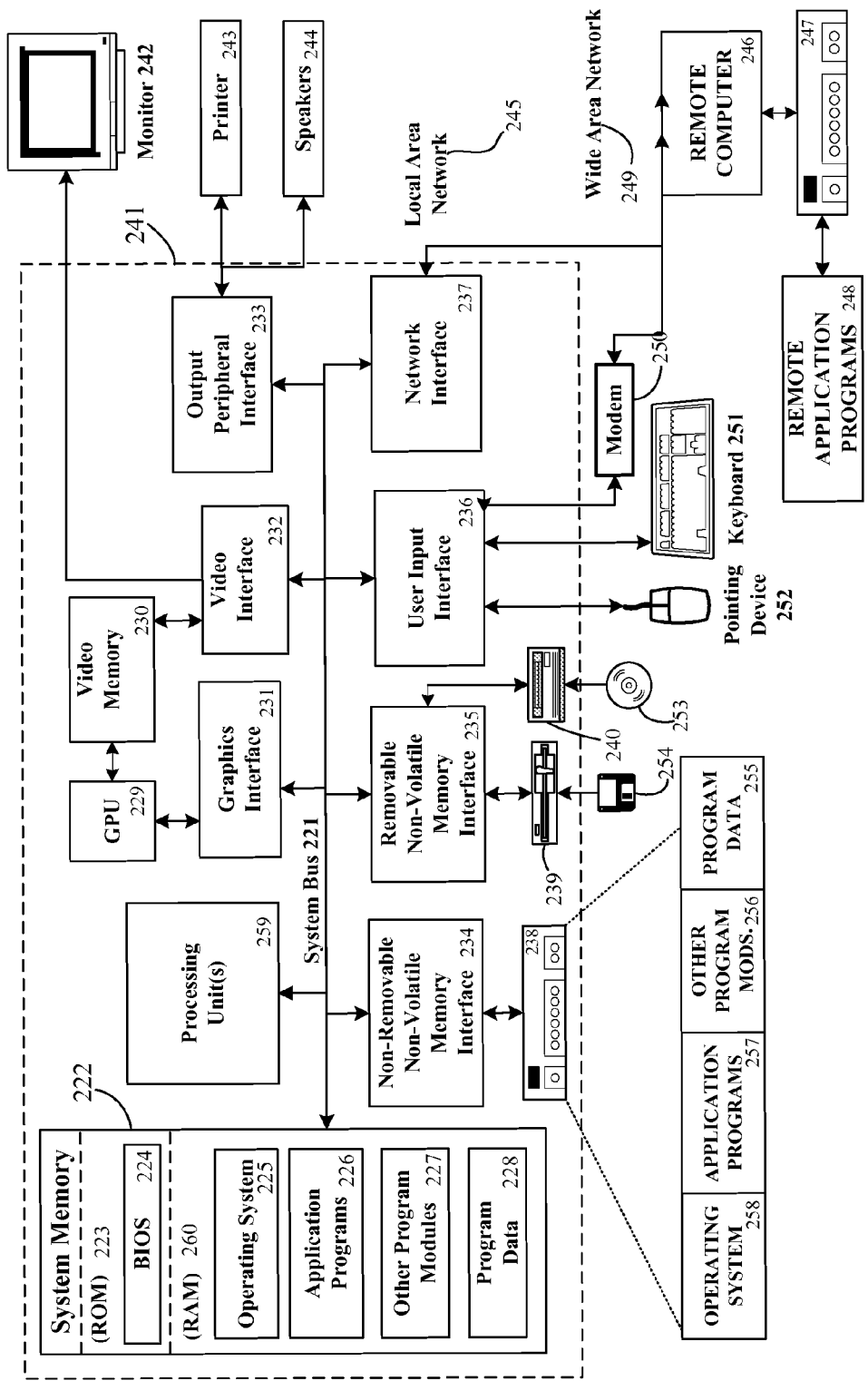
FIG. 2 illustrates an exemplary computing environment for subject matter discussed herein.

Second, now turning to FIG. 2, illustrated is a block diagram representing an exemplary computing device that may be suitable for use in conjunction with implementing the subject matter disclosed above. Numerous embodiments of the present disclosure may execute on a computer. For example, the computer executable instructions that carry out the processes and methods for providing PC experiences on gaming consoles may reside and/or be executed in such a computing environment as shown in FIG. 1. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220.

In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 241 typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 2 illustrates operating system 225, application programs 226, other program modules 227, and program data 228.

The computer 241 may also include other removable/non-removable, volatile/nonvolatile computer storage media. By way of example only, FIG. 2 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 2, provide storage of computer readable instructions, data structures, program modules and other data for the computer 241. In FIG. 2, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 2. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 2 illustrates remote application programs 248 as residing on memory device 247. It may be appreciated that the network connections shown are exemplary and other means of establishing a communications link between the computers may be used.

Augmented Lighting Environment

One aspect of correctly rendering virtual objects in a physical world of an augmented reality display is properly rendering the lighting of the virtual object and adjusting the physical world's appearance because of the inclusion of the virtual object.

When analyzing the physical lighting environment, the light sources which provide light to the physical world can be determined or estimated. Determining or estimating a light source includes measuring or estimating one or more of the following light characteristics: the location of the light source, the direction of the light, the color of the light, the shape of the light, the intensity of the light, and the coherence or diffusion properties of the light. A physical lighting environment model of the physical world can be constructed using these characteristics of each light source.

Figure 3A:
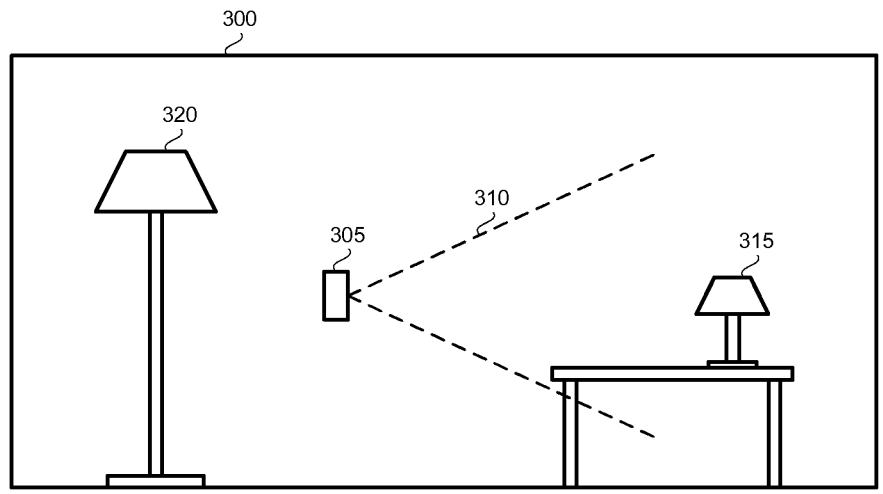
FIGS. 3A and 3B illustrate exemplary physical environments showing a device with a single light sensor, and local and ambient light sources in the environment.
Figure 3B:
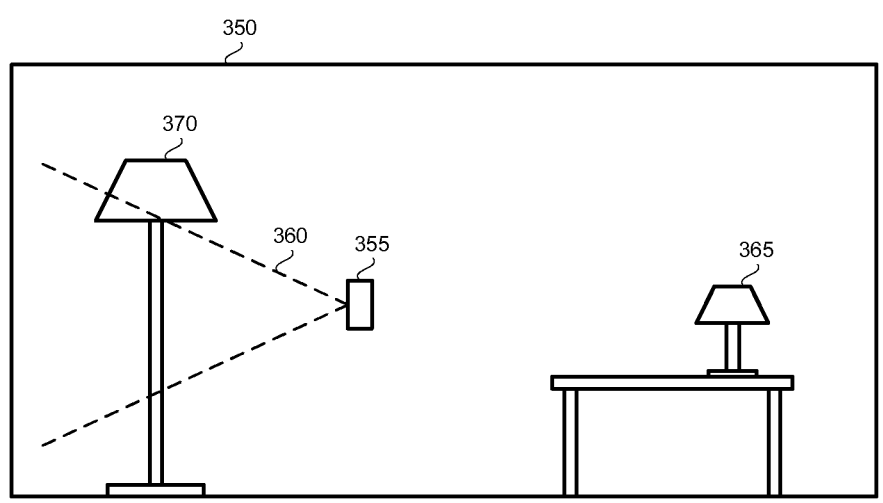

A light source that can be directly determined by measuring the light characteristics with a light sensor is a local light source. A local light source can be within the immediate view of the light sensor. For example, referring to the exemplary environment 300 in FIG. 3A, the desk lamp 315 is within the viewable range 310 of camera 305. Since light characteristics of desk lamp 315 could be measured by camera 305, desk lamp 315 is a local light source. A local light source can also be near the immediate view of the light sensor. For example, referring to the exemplary environment 350 in FIG. 3B, room lamp 370 is near or just outside of the boundary of the viewable range 360 of camera 355. While the actual source may not be within the immediate view of the camera 355, the camera 355 may still be able to measure light characteristics of room lamp 370 such that room lamp 370 is a local light source.

One way in which a light sensor can measure characteristics of a local light source is by examining shadows cast by objects from the light of the local light source. For example, in FIG. 3B, if a chair (not shown) were located between the room lamp 370 and the left wall, the chair would cast a shadow on the left wall from the light emitted by room lamp 370. Knowing the position of the chair and the wall, it is possible to use the characteristics of the shadow to determine light characteristics of room lamp 370, such as intensity and location of the room lamp 370. Thus, by analyzing the shadows visible to a light sensor and measuring the characteristics of the light which cause the object to cast the shadow, the light's source can be a local light source even if it is not located within the immediate view of the light sensor. Analyzing observed shadows in a captured image can also serve to provide information about the coherence and shape of the light source. The intensity and dimensions of a shadow's umbra, penumbra, and antumbra may be measured, the relative diffusion of the light source may be inferred, and the information may then be applied in virtual lighting. The analysis of shadows can also aid in the estimation of ambient light sources and in refining the measurement and estimation of the light characteristics of both local and ambient light sources.

A local light source can be a light source that is not within or near the immediate view of the light sensor if the light source had previously been within the immediate view of the light sensor. For the light source to remain a local light source over time, the light sensor's orientation must be tracked and it may be necessary to assume that the local light source's light characteristics have not changed. For example, FIG. 3A can represent a first instance in time and FIG. 3B can represent a second instance in time. Between the instances of FIGS. 3A and 3B, the camera's orientation would change from that shown by camera orientation 305 to camera orientation 355. In the instance shown by FIG. 3A, the desk lamp is a local light source. As the camera's orientation changes, the camera can track its own movements, and know where it is with respect to the location of the desk lamp. Then, in the instance shown by FIG. 3B, although the desk lamp is no longer within or near the viewable range of the camera, the desk lamp can still be considered a local light source if it is assumed that the light characteristics of the desk lamp have not changed (i.e., location of the desk lamp remains the same, the intensity of the light remains constant, etc.). In this example, in the instance shown by FIG. 3B, both the desk lamp and the room lamp are local light sources.

A light source that cannot be directly determined by measuring the light characteristics with a light sensor is an ambient light source. Ambient light represents the light in the physical world that cannot be accounted for when taking into account all of the local light sources. The light characteristics of ambient light sources cannot be directly determined; however, the light characteristics can be estimated based on the color and intensity of the ambient light. For example, referring to FIG. 3A, camera 305 would not be able to account for the light emanating from room lamp 320. However, after taking into account the light produced by desk lamp 315, a local light source, camera 305 could estimate the presence of room lamp 320 based on color and intensity of the ambient light.

It is possible to have more than one ambient light source. For example, in FIG. 3A, there could be a window (not shown) on the wall to the left of room lamp 320. Sunlight may enter the room through the window from a different angle, with a different color and with a different intensity than the light emanating from the room lamp 320. In this case, it may be possible for the camera to determine that the ambient light actually has two sources, and estimate those sources accordingly.

Figure 4:
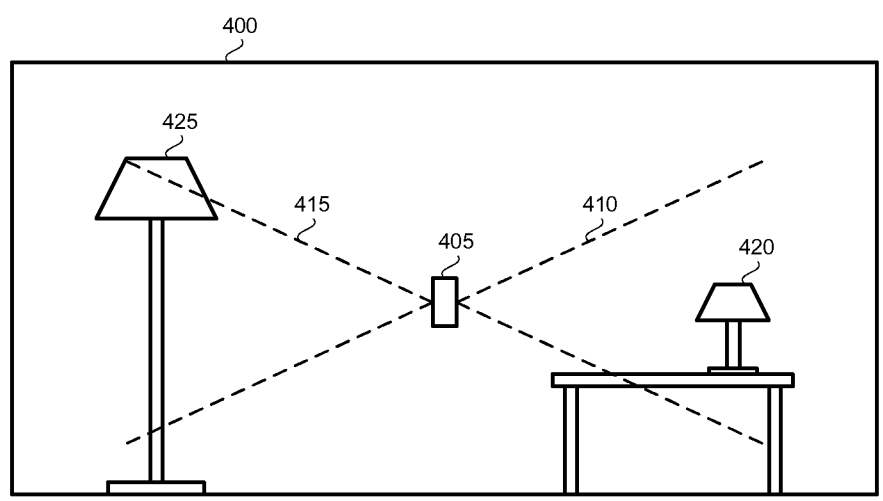
FIG. 4 illustrates an exemplary physical environment showing a device with two light sensors, and local and ambient light sources in the environment.

Referring to FIG. 4, in one embodiment, a sensor device is equipped with two opposite-facing light sensors. These sensors can simultaneously sense light from two sides of the device. In the exemplary embodiment shown in FIG. 4, device 405 contains a scene-facing camera with viewable range 410 and a user-facing camera with viewable range 415. By adding a second camera, the cumulative viewable range increases to detect a greater number of local light sources. In the orientation shown in FIG. 4, the two viewable ranges are able to simultaneously detect desk lamp 420 and room lamp 425 without changing the orientation of the device 405.

To improve on the cumulative viewing range of a sensor device, any number of light sensors could be placed around the device to simultaneously determine local light sources. Ideally, the sensor device would be capable of viewing in all directions around the device and defining all light sources as a local light sources.

Once all local light sources are measured and all ambient light sources are estimated, all the light sources can be combined to form a synthesized physical lighting environment (SPLE). The light characteristics of the physical lighting environment can be applied to a virtual object in the physical world of an augmented reality display.

A number of lighting models can be used in a virtual reality environment applying the light sources of the physical lighting environment to the virtual object. The following equation is one formula that can be used in a lighting model:

$$f(x_{object}) = k_e + k_a i_a + \sum_{m=1}^{local} \frac{k_{dm}(L \cdot N)i_{dm} + k_{sm}(N \cdot H)^\alpha i_{sm}}{k_c + k_l d + k_q d^2} \quad (1)$$

where the terms of the equation are defined in Table 1.

TABLE 1

Description of variables in Formula 1.

| | |
|---|---|
| $k_e =$ | emissive term of the virtual object |
| $k_a =$ | ambient term of the virtual object |
| $i_a =$ | color and intensity of the ambient light source supplied by SPLE |
| $k_{dm} =$ | diffuse constant for each local light source |
| $L =$ | direction vector for each local light source supplied by SPLE |
| $N =$ | virtual object surface normal |
| $i_{dm} =$ | color and intensity of each local light source supplied by SPLE |
| $k_{sm} =$ | specular constant of the virtual object |
| $H =$ | normalized half-angle vector between the view and light direction vectors |
| $\alpha =$ | shininess factor of the virtual object |
| $i_{sm} =$ | specular constant of each local light sources supplied by SPLE |
| $k_c =$ | constant light attenuation factor |
| $k_l =$ | linear light attenuation factor |
| $k_q =$ | quadratic light attenuation factor |
| $d =$ | distance to each local light source supplied by SPLE |

For each of the terms in Formula I supplied by the SPLE, it would be possible to use an estimate in place of the value supplied by the SPLE. However, with the hardware-supplied lighting characteristics supplied to the SPLE, the realism of virtual objects is enhanced. A few common scenarios in which a virtual object's realism is enhanced using the SPLE include:

Differentiation of indoor and outdoor lighting depending on the location of the light sensor.

Where the light sensor and a light source move independently (e.g., a digital camera and a flashlight), the augmented reality display would dynamically update the rendering of the virtual object based on the orientation of the light sensor and the light source.

With a sudden loss of all light in the physical environment, the virtual objects would also go dark, instead of remaining bright in the augmented reality display.

Virtual objects are rendered with appropriate light levels based on time of day. Night rendering may require a blue-shift, while day rendering may require a red shift.

Shadows of virtual objects can be rendered appropriately based on direction and distance from physical light sources.

One intent in using values from the SPLE is to give the virtual object of an augmented reality display the look and feel of objects in the physical world. The closer the SPLE is able to duplicate the lighting environment of the physical world, the less a viewer of the augmented reality will be able to differentiate between virtual objects and physical objects.

Another intent in using values from the SPLE is to render physical objects in the augmented reality display where the lighting of the physical object is affected by a virtual object. For example, when a virtual object is placed into an augmented reality display, it may cast a shadow on an object in the physical world. In order to correctly render the augmented reality display, images of the physical objects will need to be rendered and/or modified to reflect the shadow cast by the virtual object. For shadow casting, it may be sufficient to simply darken the appropriate pixels of the augmented reality display to properly render the augmented object's shadow. In another example, the virtual object may be a virtual light source. When the virtual object is a light source, it may illuminate a physical object in the augmented reality display.

The augmented reality display may be connected to a database which contains the characteristics of physical objects. When a physical object is recognized in a captured image, these characteristics may be looked up in order to properly display the physical object. This is especially beneficial where a physical object is illuminated by a virtual light source. In this case, a light sensor may be unable to determine the characteristics of the physical object if it were illuminated; however, where those characteristics of the physical object are already known and available, the physical object can be properly rendered, or its captured image modified, in the augmented reality display as if it were illuminated.

Figure 5:
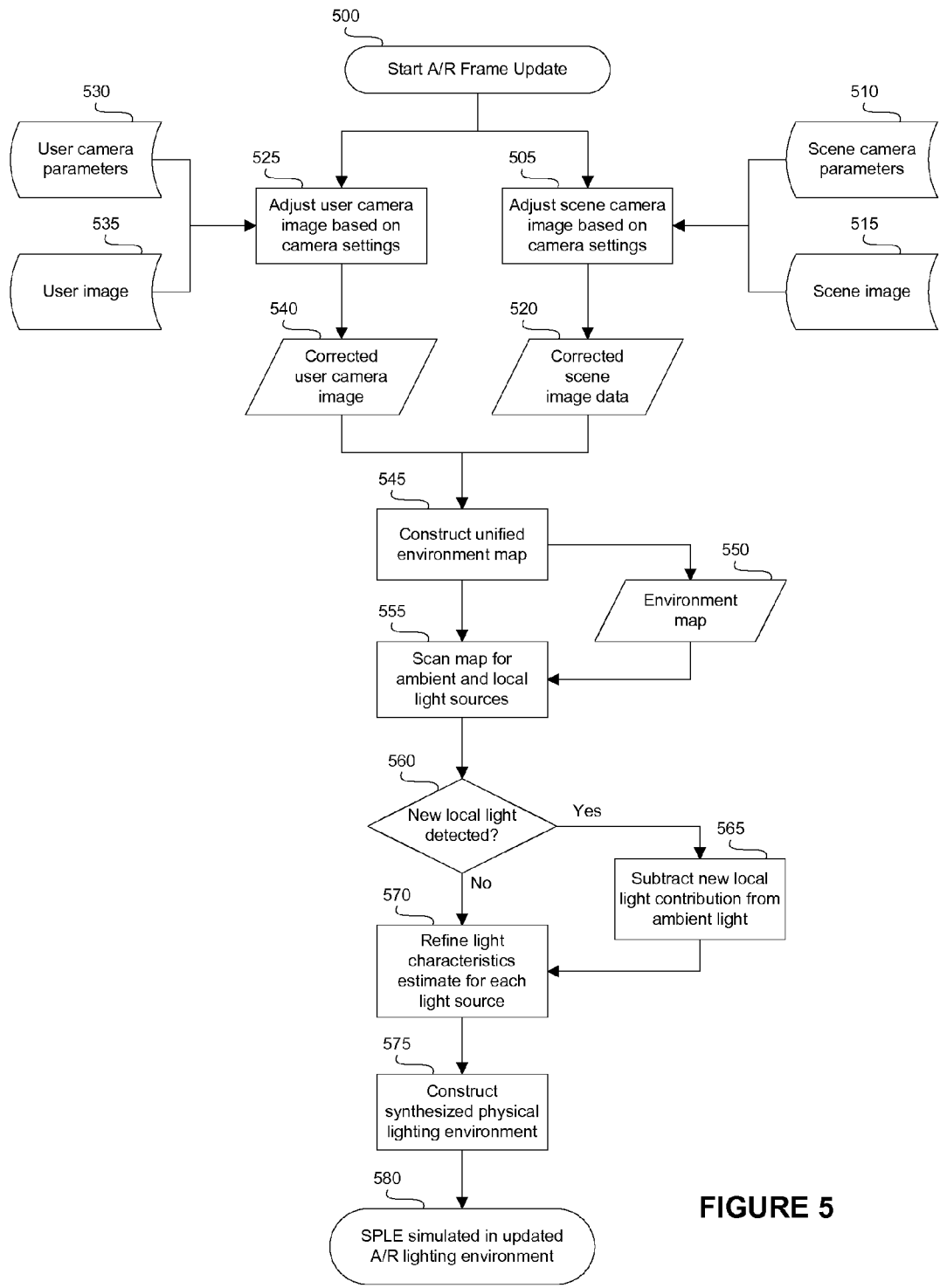
FIG. 5 illustrates a flowchart for updating a frame-based display of a virtual object in an augmented reality display.

Referring now to FIG. 5, an iterative process is shown for updating the lighting environment in a frame of an augmented reality display using a sensor device with a user-facing camera and a scene facing camera. Because this is an iterative process, the start 500 is actually the beginning of an update of an augmented reality frame. This assumes that there is a previous frame to update. With the first frame that each camera detects, a processor interprets the entire frame as ambient light of a single intensity and color using a simple weighted average.

In the iterative process of updating an augmented reality frame, the image from the scene-facing camera 515 and the image from the user-facing camera 535 are initially processed independently. The configuration parameters of each camera (e.g., aperture size, shutter speed, etc.) affect the image that it produces. In step 505, the scene-facing camera parameters 510 are used to adjust the scene-facing camera image 515. The result of step 505 is corrected scene image data 520. Similarly, in step 525, the user-facing camera parameters 530 are used to adjust the user-facing camera image 535. The result of step 525 is corrected scene image data 540.

Once corrected scene image data 520 and user image data 540 are determined, the two images are used to construct 545 an environment map 550. Next, environment map 550 is scanned 555 to determine the local and ambient light sources in the environment. If it is determined that a new local light source is in the map 560, then the light accounted for by the local light source is subtracted from the ambient light 565.

Once all the local light sources have been identified, including subtracting the light from a new local light source if necessary, the light characteristics of each light source (both local and ambient) is refined 570. These characteristics can include location, orientation, light color, light intensity, and other characteristics. The location of a light source should be determined not simply with respect to the light sensor, but also with respect to the physical environment. If either or both of the light sensor and the local light source are moving with respect to the environment, the movement will affect the rendering of the virtual objects in the augmented reality display. Distance to a local light source can be measured based on motion parallax of the light over subsequent input frames. Motion of the light sensor can be tracked with gyroscopes, accelerometers, or other similar instruments. Motion of the light sensor can also be tracked using the light sensor itself in the case that the light sensor is a camera.

The refinement of light characteristics 570 can also include extrapolation of the light characteristics of the local and ambient light sources to detect secondary environment characteristics. Such detection of secondary environment characteristics may include detection of outdoor or indoor lighting environment (e.g., sunlight, moonlight, indoor fluorescent light, etc), detection of low light scenarios, detection of rapid changes in the physical lighting environments (which may prompt a rapid recolorization process), and other similar situations. While secondary, these secondary environment characteristics may be useful in constructing an SPLE for a more realistic rendering of the virtual objects.

After all the light characteristics are refined based on the new environment map, an SPLE is constructed 575 based on the refined light characteristics. With the SPLE constructed based on the refined light characteristics, the lighting on the virtual objects in the augmented reality scene are rendered based on the SPLE 580.

The iterative process described above has numerous benefits These benefits include, without limitation, determining an estimate of ambient light sources, softening virtual images to appear more realistic, improving the accounting of local light over time as more local light sources are detected, and removing identified local light from the ambient source estimation. The construction of the SPLE can further serve to enhance the modeling of the physical lighting environment with a corrective bias or a hint bias on the SPLE.

The foregoing description has set forth various embodiments of the apparatus and methods via the use of diagrams and examples. While the present disclosure has been described in connection with the preferred embodiments of the various figures, it is to be understood that other similar embodiments may be used or modifications and additions may be made to the described embodiment for performing the same function of the present disclosure without deviating there from. Therefore, the present disclosure should not be limited to any single embodiment, but rather construed in breadth and scope in accordance with the appended claims. Additional features of this disclosure are set forth in the following claims.

What is claimed is:

1. A method of rendering a display, the method comprising:
identifying at least one local light source based on data related to the physical lighting environment that is received from a first sensor;
measuring a first light characteristic of the at least one local light source in a physical lighting environment;
determining movement and orientation of the at least one local light source based on the at least one light characteristic of the at least one local light source with respect to the light sensor and further based on movement and orientation of the first light sensor;
estimating a second light characteristic of at least one ambient light source based on light in the physical lighting environment not attributable to a local light source;
forming a synthesized lighting environment based at least on the first light characteristic and the second light characteristic; and
rendering a virtual object in an augmented reality display, wherein the lighting of the virtual object is based on the synthesized lighting environment.

2. The method of claim 1, wherein the first light characteristic is at least one of the following: a position of the at least one local light source, an orientation of the at least one local light source, a color of the light of the at least one local light source, an intensity of the at least one local light source, a coherence or diffusion of the local light source, and an area of the local light source.

3. The method of claim 1, further comprising:
receiving data related to the physical lighting environment from a second sensor, wherein the second sensor receives light from a direction different than the first sensor.

4. The method of claim 1, further comprising:
determining movement and orientation of the first sensor using a movement sensor associated with the first light sensor.

5. The method of claim 1, wherein the first light sensor is a digital camera.

6. The method of claim 1, the measuring a first light characteristic of the at least one local light source comprising:
measuring at least one characteristic of a shadow; and determining the first light characteristic of the at least one local light source based on the at least one characteristic of the shadow.

7. A computer readable storage medium having stored thereon computer-executable instructions, the computer readable storage medium excluding signals per se, the instructions comprising instructions that, when executed by a processor in a computing system, at least cause the computing system to:
identify in data received from a sensor at least one local light source in a physical lighting environment;
estimate at least one characteristic of a shadow;
estimate a first light characteristic of the at least one local light source based on the at least one characteristic of the shadow;
estimate a second light characteristic of at least one ambient light source based on light in the physical lighting environment not attributable to a local light source;
synthesize a lighting environment based at least on the first light characteristic and the second characteristic; and
render a virtual object in an augmented reality display, wherein the lighting of the virtual object is based on the synthesized lighting environment.

8. The computer readable storage medium of claim 7, the instructions further comprising instructions that, when executed by the processor in the computing system, at least cause the computing system to:
receive data related to the physical lighting environment from a second light sensor, wherein the second light sensor is oriented to face in a different direction from the first light sensor.

9. The computer readable storage medium of claim 7, the instructions further comprising instructions that, when executed by the processor in the computing system, at least cause the computing system to:
determine movement and orientation of the first light sensor using a movement sensor associated with the first light sensor.

10. The computer readable storage medium of claim 9, the instructions further comprising instructions that, when executed by the processor in the computing system, at least cause the computing system to:
determine movement and orientation of the at least one local light source based on the at least one light characteristic of the at least one local light source with respect to the light sensor and further based on the movement and orientation of the first light sensor.

11. The computer readable storage medium of claim 7, wherein the first light sensor is a digital camera.

12. The computer readable medium of claim 7, wherein the first light characteristic is one of the following: a position of the at least one local light source, an orientation of the at least one local light source, a color of the light of the at least one local light source, an intensity of the at least one local light source, a coherence or diffusion of the local light source, and an area of the local light source.

13. A device for use in determining a physical lighting environment, the device comprising:
a processor;
memory having stored therein instructions executable by the device, the instructions comprising:
instructions to identify at least one local light source based on the data generated by a first light sensor related to the physical lighting environment,
instructions to measure a first light characteristic of the at least one local light source,
instructions to attribute light in the physical lighting environment to at least one ambient light source based on light in the physical lighting environment not attributable to the at least one local light source,
instructions to estimate a second light characteristic of the at least one ambient light source based on light in the physical lighting environment not attributable to a local light source,
instructions to form a synthesized lighting environment based at least on the first light characteristic and the second light characteristic, and
instructions to render a virtual object in an augmented reality display, wherein the lighting of the virtual object is based on the synthesized lighting environment; and
a second light sensor configured to generate data relating to the physical environment, the second light sensor being oriented to face in a different direction than the first light sensor.

14. The device of claim 13, wherein the processor is further configured to receive data related to the physical lighting environment from the second light sensor.

15. The device of claim 14, wherein the processor is further configured to identify at least one local light source based on the data generated by the second light sensor related to the physical lighting environment.

16. The device of claim 13, wherein the first light characteristic is one of the following: a position of the at least one local light source, an orientation of the at least one local light source, a color of the light of the at least one local light source, an intensity of the at least one local light source, a coherence or diffusion of the local light source, and an area of the local light source.

17. A method of updating the rendering of a virtual object in an augmented reality display, wherein light characteristics of light sources in a physical environment were previously determined for use in rendering the virtual object, the method comprising:
receiving a first image and at least one parameter from a user-facing light sensor;
correcting the first image based on the at least one parameter of the user-facing light sensor;
receiving a second image and at least one parameter from a scene-facing light sensor;
correcting the second image based on the at least one parameter of the scene-facing light sensor;
constructing an environment lighting map based on the corrected first image and the corrected second image;
determining light sources in the environment lighting map, wherein the light sources comprise at least one local light source and at least one ambient light source;
updating the previously-determined light characteristics of the light sources based on characteristics of the light sources determined in the environment lighting map; and
rendering a virtual object in an augmented reality display based on the updated light characteristics, the rendering comprising referencing the environment lighting map for reflection and refraction of the physical environment on the virtual object.

18. The method of claim 17, further comprising:
constructing a synthesized lighting environment based on the characteristics of the light sources determined in the environment lighting map;
wherein the rendering a virtual object is based on the synthesized lighting environment.

19. The method of claim 17, further comprising:
determining that a new local light source in the environment map was not determined previously; and
attributing light in the environment map to the new local light source by reducing an amount of light attributed to the at least one ambient light source.

20. The method of claim 19, the updating the previously-determined light characteristics of the light sources comprising taking into account characteristics of the new local light source.

21. A computer readable storage medium comprising instructions for updating the rendering of a virtual object in an augmented reality display, wherein light characteristics of light sources in a physical environment were previously determined for use in rendering the virtual object, the computer readable storage medium excluding signals per se, the instructions comprising instructions that, when executed by a processor in a computing system, at least cause the computing system to:
receive a first image and at least one parameter from a user-facing light sensor;
correct the first image based on the at least one parameter of the user-facing light sensor;
receive a second image and at least one parameter from a scene-facing light sensor;
correct the second image based on the at least one parameter of the scene-facing light sensor;
construct an environment lighting map based on the corrected first image and the corrected second image;
determine light sources in the environment lighting map, wherein the light sources comprise at least one local light source and at least one ambient light source;
update the previously-determined light characteristics of the light sources, wherein the updating is based on the characteristics of the light sources determined in the environment lighting map;
construct a synthesized lighting environment based on the characteristics of the light sources determined in the environment lighting map; and
render a virtual object in an augmented reality display based on the updated light characteristics and based on the synthesized lighting environment.

22. The computer readable storage medium of claim 21, the instructions further comprising instructions that, when executed by the processor in the computing system, at least cause the computing system to:
determine that a new local light source in the environment map was not determined previously; and
attribute light in the environment map to the new local light source by reducing an amount of light attributed to the at least one ambient light source.

23. The computer readable storage medium of claim 22, updating the previously-determined light characteristics of the light sources comprising taking into account characteristics of the new local light source.

24. The computer readable storage medium of claim 21, rendering the virtual object comprising referencing the environment lighting map for reflection and refraction of the physical environment on the virtual object.

25. A device for updating the rendering of a virtual object in an augmented reality display, wherein light characteristics of light sources in a physical environment were previously determined for use in rendering the virtual object, the device comprising:
a user-facing light sensor configured to take a first image;
a scene-facing light sensor configured to take a second image; and
a processor configured to:
correct the first image based on at least one parameter of the user-facing light sensor,
correct the second image based on at least one parameter of the scene-facing light sensor,
construct an environment lighting map based on the corrected first image and the corrected second image,
determine light sources in the environment lighting map, wherein the light sources comprise at least one local light source and at least one ambient light source,
determine that a new local light source in the environment lighting map was not determined previously,
attribute light in the environment lighting map to the new local light source by reducing an amount of light attributed to the at least one ambient light source,
update the previously-determined light characteristics of the light sources, wherein the updating is based on the characteristics of the light sources determined in the environment lighting map, and
render a virtual object in an augmented reality display based on the updated light characteristics.

26. The device of claim 25, the processor further configured to:
construct a synthesized physical lighting environment based on the characteristics of the light sources determined in the environment lighting map, and render a virtual object is based on the synthesized lighting environment.

27. The device of claim 25, the processor being configured to update the previously-determined light characteristics of the light sources by taking into account characteristics of the new local light source.

28. The device of claim 25, the processor being configured to render the virtual object by referencing the environment lighting map for reflection and refraction of the physical environment on the virtual object.

* * * * *